United States Patent [19]

Lee et al.

[11] Patent Number: 5,443,315
[45] Date of Patent: Aug. 22, 1995

[54] MULTI-ZONE REAL-TIME EMISSIVITY CORRECTION SYSTEM

[75] Inventors: Yong J. Lee, Richardson; Mehrdad M. Moslehi, Dallas, both of Tex.

[73] Assignee: Texas Instruments Incorporated, Dallas, Tex.

[21] Appl. No.: 168,450

[22] Filed: Dec. 16, 1993

[51] Int. Cl.⁶ .............................. G01J 5/02; G01J 5/52; G01N 25/00

[52] U.S. Cl. ................................... 374/126; 374/128; 374/9

[58] Field of Search .......................... 374/9, 126, 128; 250/338.1

[56] References Cited

U.S. PATENT DOCUMENTS

| | | | |
|---|---|---|---|
| 4,919,542 | 4/1990 | Nulman et al. | 374/126 |
| 4,956,538 | 9/1990 | Moslehi | 219/121.6 |
| 5,061,084 | 10/1991 | Thompson et al. | 374/128 |
| 5,114,242 | 5/1992 | Gat et al. | 374/126 |
| 5,156,461 | 10/1992 | Moslehi et al. | 374/126 |
| 5,188,458 | 2/1993 | Thompson et al. | 374/128 |
| 5,305,417 | 4/1994 | Najm et al. | 375/126 |
| 5,308,161 | 5/1994 | Stein | 374/126 |

FOREIGN PATENT DOCUMENTS

0030916 2/1982 Japan ........................ 374/9

Primary Examiner—Diego F. F. Gutierrez
Attorney, Agent, or Firm—Jacqueline J. Garner; Richard L. Donaldson; William E. Hiller

[57] ABSTRACT

A multi-zone emissivity correction system and method that may be used in a multi-zone illuminator of a RTP-AVP system. The multi-zone illuminator comprises a plurality of lamps arranged in zones. A dummy lamp is also provided for each zone. A first plurality of sensors monitor the wafer and a second plurality of sensors monitor dummy lamp radiance. For each zone, an emissivity factor is determined based on the first and second pluralities of sensors. An effective black body radiance is also determined for each zone based on a wafer radiance factor for each zone and the emissivity factors.

8 Claims, 9 Drawing Sheets

ATTENUATION
COEFFICIENT
(1/CM)

FIG. 18

BULK
TRANSMISSION

MULTI-ZONE REAL-TIME EMISSIVITY CORRECTION SYSTEM

CROSS-REFERENCE TO OTHER APPLICATIONS

The following co-assigned patent applications are hereby incorporated herein by reference:

| Ser. No. | Filing Date | TI Case No. | Status |
|---|---|---|---|
| 08/114,550 | 08/31/93 | TI-15255B | pending |
| 08/063,110 | 05/17/93 | TI-15256A | pending |
| 07/973,362 | 11/09/92 | TI-16090 | pending |
| 08/056,599 | 08/10/93 | TI-16991A | U.S. Pat. No. 5,367,606 |
| 08/168,433 | 12/16/93 | TI-17994 | pending |

FIELD OF THE INVENTION

This invention generally relates to real-time sensors for semiconductor processing and more specifically to a method and system for multi-zone real-time emissivity correction for multi-point pyrometry temperature sensors.

BACKGROUND OF THE INVENTION

As semiconductor wafer processing moves toward the flexibility of single wafer processing, the ability to accurately measure and control the process and wafer state parameters becomes increasingly important. One of the most important parameters that need to be accurately monitored and controlled is wafer temperature. Currently, a majority of thermally activated single wafer processes such as rapid thermal processes rely on pyrometric temperature measurements. Pyrometric measurement, however, has several limitations. One of the most important limitations is that the temperature measurements are dependent on the emissivity of the wafer. The emissivity is a function of various wafer states including film material/thickness, substrate doping, and backside roughness. It is also strongly dependent on temperature. Thus, there is a need to correct the pyrometric temperature measurement for emissivity.

SUMMARY OF THE INVENTION

A system and method for multi-zone real-time emissivity correction for a multizone illuminator having a plurality of zones is disclosed. The preferred embodiments may be applied to a multi-zone illuminator having a plurality of lamps arranged in a plurality of zones. A geometry factor for each of the zones from each of the zones is determined. The lamp power supplies are modulated and the radiance of a wafer (along with any lamp interference) is monitored using a first plurality of sensors. Each of the first plurality of sensors generates a first signal. The radiance of a plurality of dummy lamps is also monitored using a second plurality of sensors. Each of the second plurality of sensors generates a second signal. Next, an emissivity factor is determined for each zone based on the first and second signals. An effective black body radiance is then determined for each zone based on a wafer radiance factor for each zone and the emissivity factors.

An advantage of the invention is providing a multi-zone real-time emissivity correction system that measures the real-time emissivity in each zone and provides wafer temperature values adjusted for emissivity.

Another advantage of the invention is providing spectral emissivity measurement having the identical spectral sensitivity and view factor as the measurement for wafer radiance.

Another advantage of the invention is providing a multi-zone emissivity correction system that may be combined with multi-zone lamp interference correction to provide wafer temperature values adjusted for both lamp interference and emissivity.

These and other advantages will be apparent to those skilled in the art having reference to the specification in conjunction with the drawings.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

The preferred embodiment of the invention will be described in conjunction with a single-wafer Advanced Vacuum Processor (AVP) having an energy source adapted for rapid thermal processing (RTP). It will be apparent to those skilled in the art that the invention is equally applicable to other semiconductor fabrication equipment and single-wafer AVP configurations.

Figure 1:
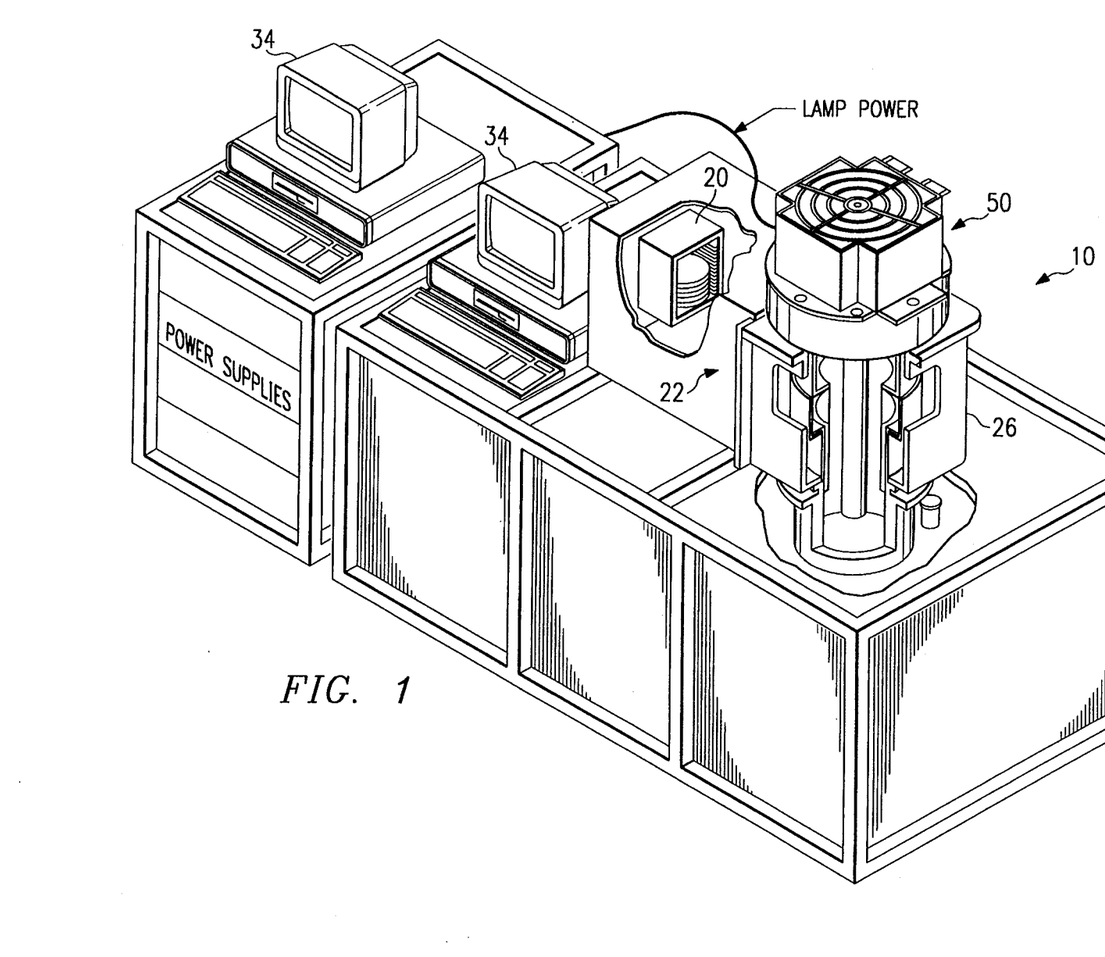
FIG. 1 is a diagram of an advanced vacuum processing (AVP) system according to the invention.
Figure 2:
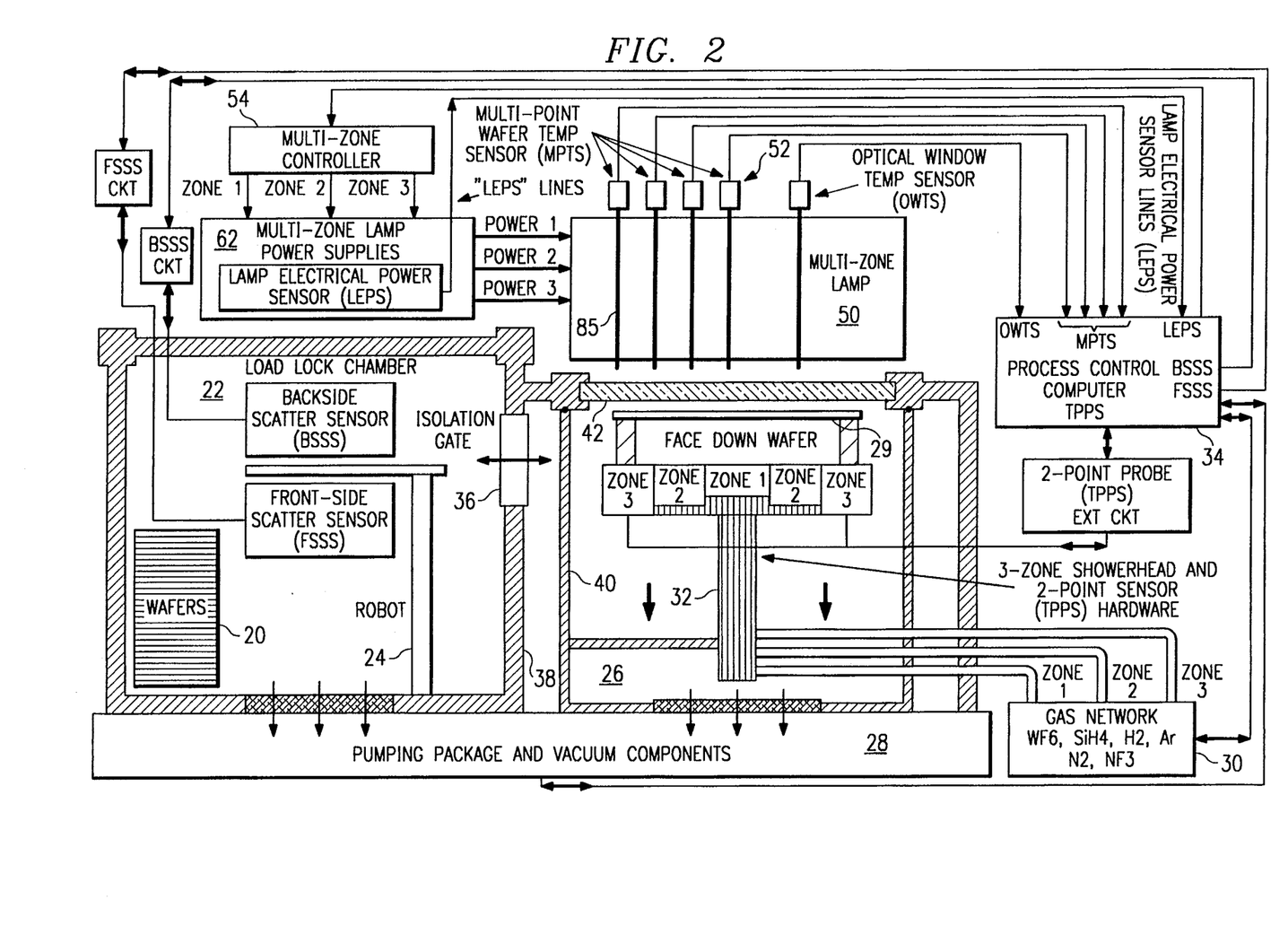
FIG. 2 is a block diagram of an RTP-AVP system with multi-point pyrometry sensors according to the invention.

As shown in FIGS. 1 and 2, the AVP machine 10, according to the invention, is a modular system that consists of a vacuum cassette 20, vacuum loadlock 22, robot handler 24, process chamber 26, vacuum pumping network 28, gas distribution network 30, gas injectors 32, and computer/electronics/software 34. The system typically occupies a footprint of 3 ft.×5 ft. and is approximately 4 ft. high. The vacuum cassette 20 may be constructed of machined aluminum with Tufram coating, and has a hinged door (not shown) for opening and losing under vacuum. The vacuum cassette 20 is typically placed under vacuum by pumping down vacuum loadlock 22, closing the hinged door, then venting the vacuum loadlock 22. The cassette 20 can then be removed under vacuum and moved to the next machine for wafer processing. The vacuum cassette 20 eliminates the need for super-clean rooms since wafers can be stored under vacuum and moved from machine to machine under vacuum.

The vacuum loadlock 22 may be constructed of anodized aluminum and house the vacuum cassette 20 and robot wafer handler 24. The robot wafer handler 24 has horizontal and vertical motion such that the wafer cassette 20 remains stationary. An isolation gate 36 is provided between the vacuum loadlock 22 and the process chamber 26 to maintain integrity for the process chamber 26, during manual insertion/removal of the vacuum cassette 20. The process chamber 26 may have a stainless steel outer chamber 38, and an inner chamber 40, made of various materials that depend on the process and sensor application. Typically, the inner chamber 40 consists of a quartz top window 42 and aluminum gas injector 32. Rapid thermal processes (RTPs) typically require a quartz window 42, quartz chamber liners within all-metal stainless steel chambers, and nickel-plated gas injectors. The inner process chamber 40 provides a small vacuum chamber inside a larger vacuum chamber and provides a symmetrical processing environment for the wafer 29 in process.

The gas distribution module 30 consist of mass-flow controllers (MFCs) housed in a safety-approved box with associated stainless steel plumbing to carry the process gasses to the process chamber 26 through point-of-use filters. The vacuum pumping network 28 typically consists of a "roughing" pump/blower module having a 250-cfm pumping capacity for the process chamber, a 60-cfm roughing pump for the loadlock 22,400-1000-1/sec turbo pumps for loadlock 22 and process chamber 26. Appropriate throttle valves and full-closure valves may be provided for automated pumping, pressure control, and venting.

The RTP reactors may employ multi-zone illuminators 50 with concentric heating zones and several in-situ sensors 52. One such multi-zone illuminator is described in U.S. patent application Ser. No. 870,446, filed Apr. 16, 1992, now U.S. Pat. No. 5,268,989 and assigned to Texas Instruments Incorporated and is hereby incorporated by reference. The multi-zone illuminators 50 are typically used in rapid thermal processes (anneals and chemical-vapor depositions) and consist of an array of concentric heating zones that provide infrared energy to the single wafer 29 through a quartz window 42. The specific reactor example shown in FIG. 2 is for a rapid thermal CVD tungsten (RTCVD-W) process. These RTP-AVP systems preferably employ high-performance multi-zone illuminators 50 with 4 axisymmetric zones for uniform 150-mm wafer heating. However, the number of zones may vary. Wafer processing and heating are performed face-down and from the backside, respectively. Power levels to the lamp zones can be adjusted in real time using a multi-zone controller 54 for optimum wafer temperature and process uniformity.

Figure 3:
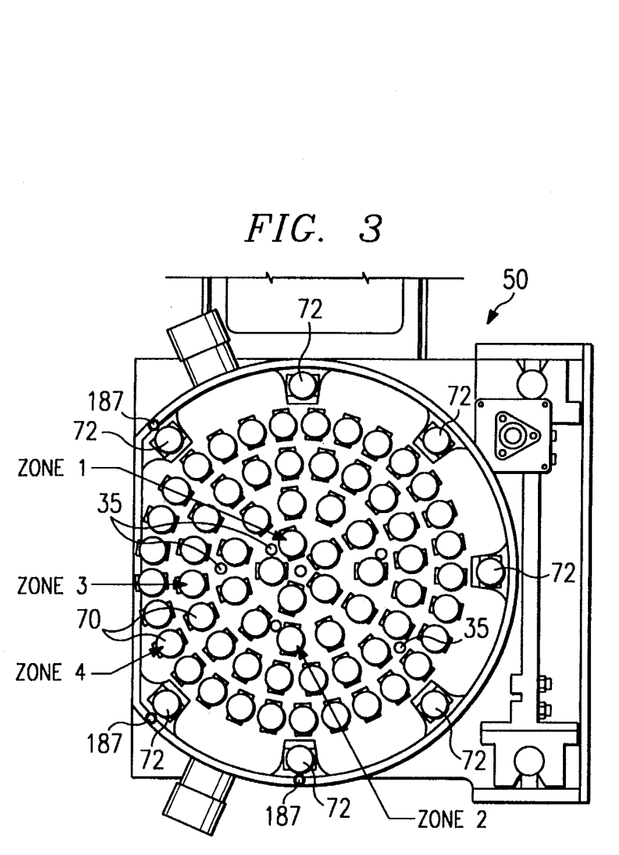
FIG. 3 is a cross-section view of a multi-zone axisymmetric illuminator according to the invention.

Referring to FIG. 3, multi-zone illuminator 50 consists of lamps 70 arranged in concentric circular rings or zones 1-4, dummy lamps 72, and hollow light-pipes 85 and 187 for multi-point pyrometry. Each illuminator zone 1-4 is connected to a separate controllable power supply (not shown) along with at least one dummy lamp 72. The dummy lamps 72 are optically isolated from the wafer and heating lamps 70. The detector system consists of four pyrometric detectors 86 (shown in FIG. 4) that image four points on the wafer and four dummy detectors 84 (also shown in FIG. 4) that monitor the radiation from the dummy lamps 72. All eight detectors may, for example, comprise InAs pyrometric sensors that are sensitive at 3.3 $\mu$m. One such pyrometric sensor is described in co-pending U.S. patent application Ser. No. 07/973,362 filed Nov. 9, 1992, assigned to Texas Instruments, Inc. and hereby incorporated by reference. The radiation from each detection point on the wafer is imaged by a lens (not shown) and guided into the detector 86 through fluoride fiber light-pipes 85. The radiation from the dummy lamps 72 are guided into the dummy detectors 84 through light pipes 187 without lenses.

Figure 4:
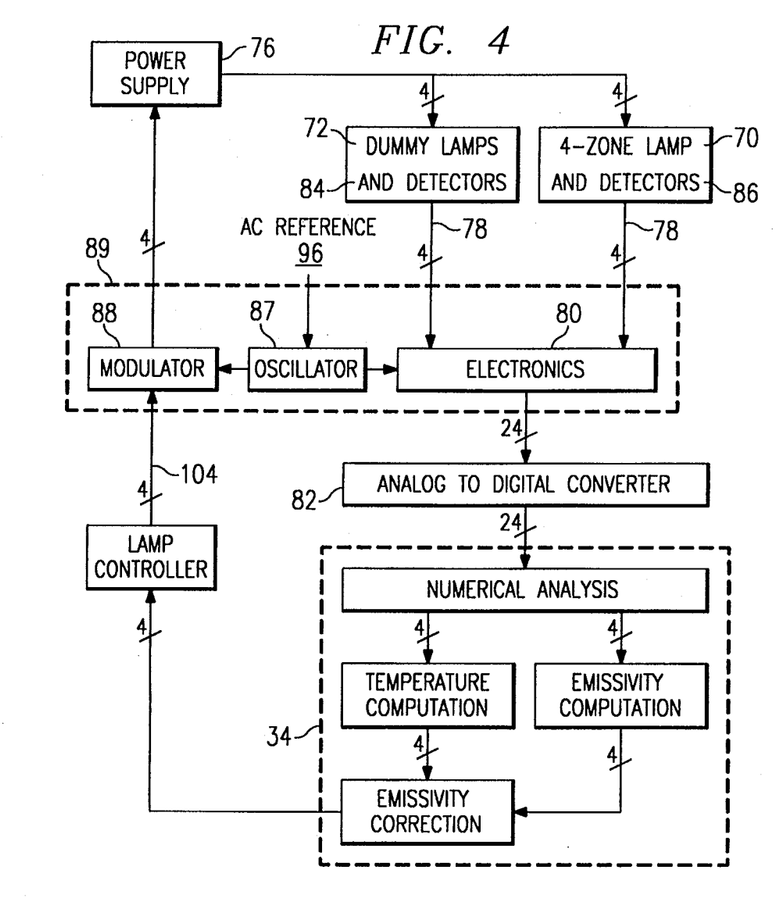
FIG. 4 is a block diagram of a multi-zone emissivity correction system according to the invention.

FIG. 4 illustrates the principle of operation of a four zone Lamp Interference Correction System. Each of the four zones has a dummy lamp 72 which is given the same electrical input as the lamps 70 used for wafer heating. The lamp control signal 74 into the power supply 76 of each lamp zone 1-4 is modulated at 30 Hz synchronized to the AC line that drives the lamp power supply. Because the optical modulation depth is a non-linear function of the lamp power level, the modulation levels out of the lamps 70 in each zone must be monitored continuously. This is accomplished with dummy detectors 84 which monitor the radiation from the four dummy lamps 72. The detectors 86 used to measure the wafer radiance image four points on the wafer using lenses. The lensed detectors 86 receive the combination of the radiation from the wafer and the lamps 70 and the detected signals 78 are processed by an electronic circuit 80. The processed signals are then digitized by A/D converter 82 and sent to a computer 34 for digital signal processing. Because the radiation outputs from the lamps 70 are modulated, they can be separated from the wafer radiance using real-time numerical techniques. The resulting wafer radiance values corrected for lamp interference are then used to measure wafer temperature.

Figure 5:
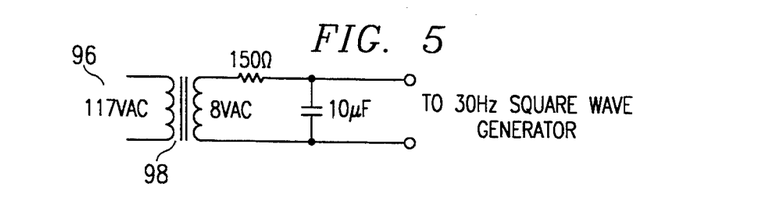
FIGS. 5-7 are schematic diagrams of a modulation circuit of the multi-zone lamp interference correction circuit of FIG. 4.
Figure 6:
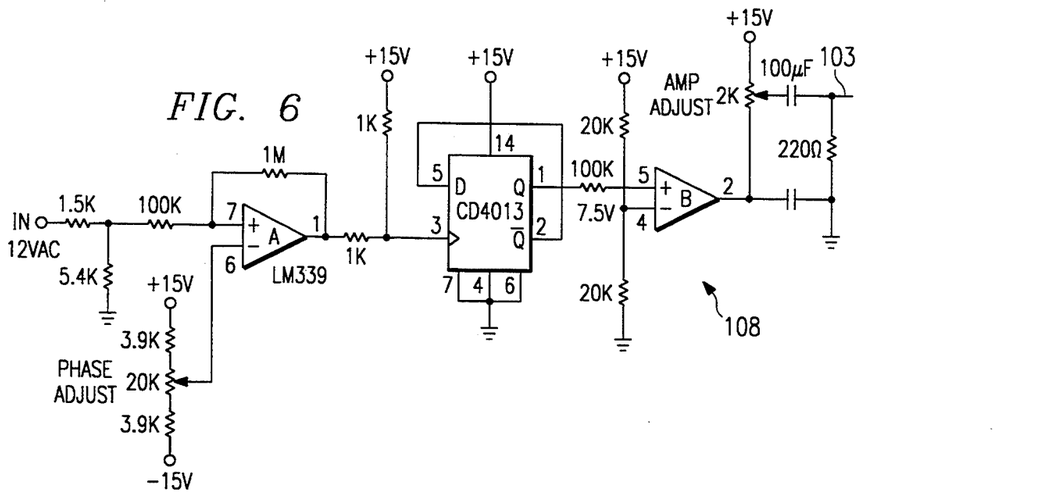
Figure 7:
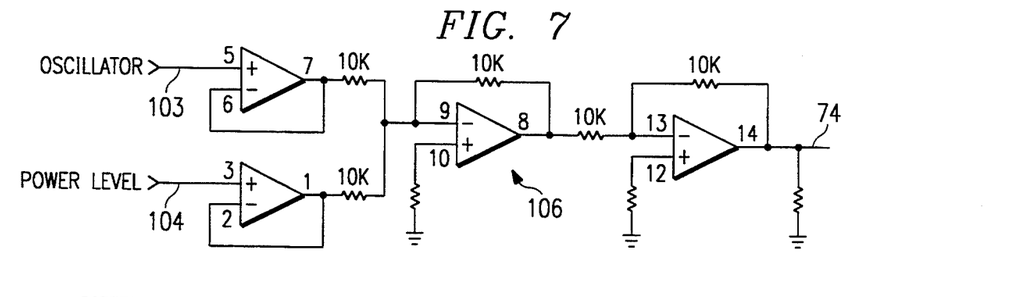

The oscillator 87 and modulator 88 make up modulation circuit 89. An example of a modulation circuit 89 is shown in detail in FIGS. 5, 6, & 7. The modulation circuit 89 takes in a line voltage 96 stepped down by a transformer 98 as shown in FIG. 5. The output of transformer 98 is applied to a 30 Hz square wave generator as shown in FIG. 6. Both the phase and amplitude of the square wave modulating signal can be varied. The output signal 103 of the 30 Hz square wave generator is added to the dc lamp control signal 104 in circuit 106 shown in FIG. 7 to produce a modulated lamp control signal 74. The lamp control signals 74 are used to switch the SCRs (not shown) that control the lamp intensity.

Figure 8:
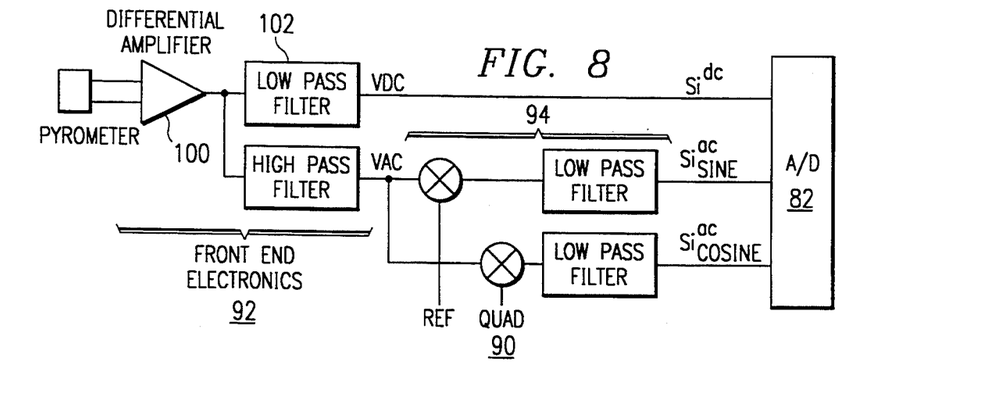
FIG. 8 is a schematic diagram of an electronic circuits of the multi-zone lamp interference correction system of FIG. 4.

Referring to FIG. 8, the electronics 80 of FIG. 4 can be separated into three parts: the quadrature reference generator circuit 90, the front-end differential amplifier circuit 92, and the demodulation circuit 94.

Figure 9:
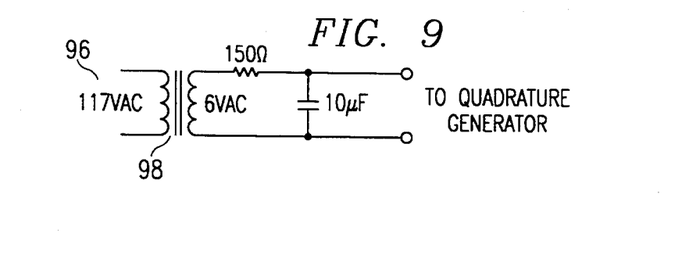
FIGS. 9-10 are schematic diagrams of a quadrature signal generator circuit of the multi-zone lamp interference correction system of FIG. 4.
Figure 10:
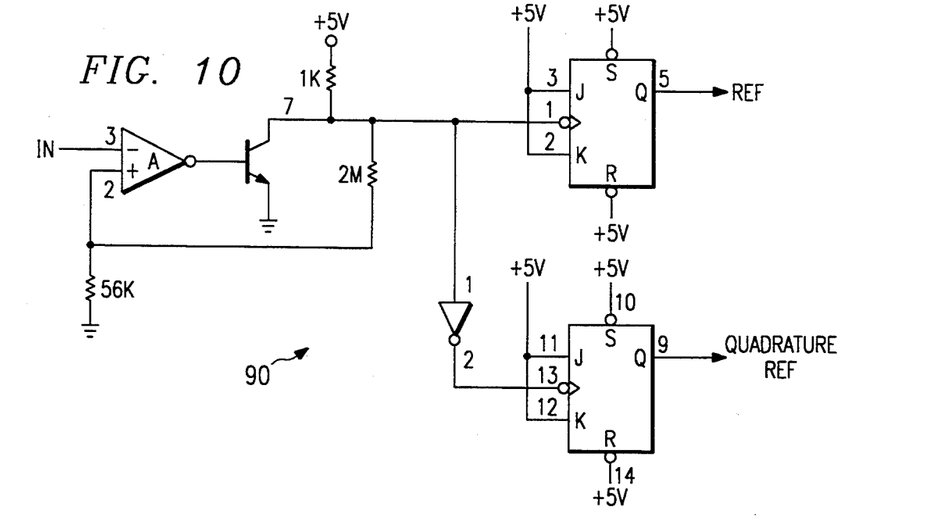

The quadrature signal generator 90 takes the same reference line signal 96 that the modulation circuit 89 uses and produces two TTL level square waves, ref and quad, 90° apart. One circuit for accomplishing this is shown in FIGS. 9 & 10. Other methods will be apparent to those skilled in the art.

Figure 11:
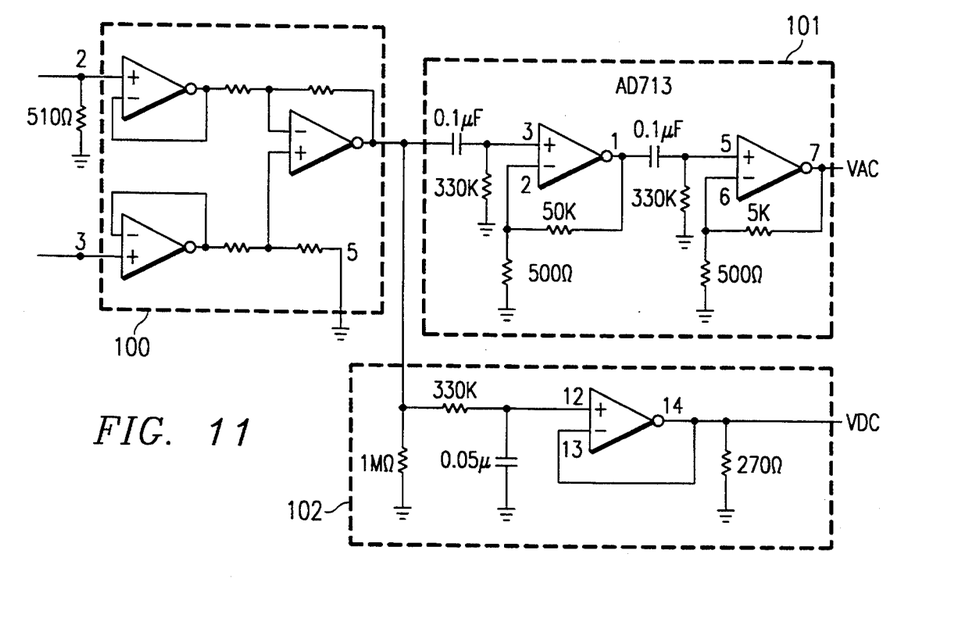
FIG. 11 is a schematic diagram of front end electronics of the electronics of FIG. 8.
Figures 12, 13, 14, 15:
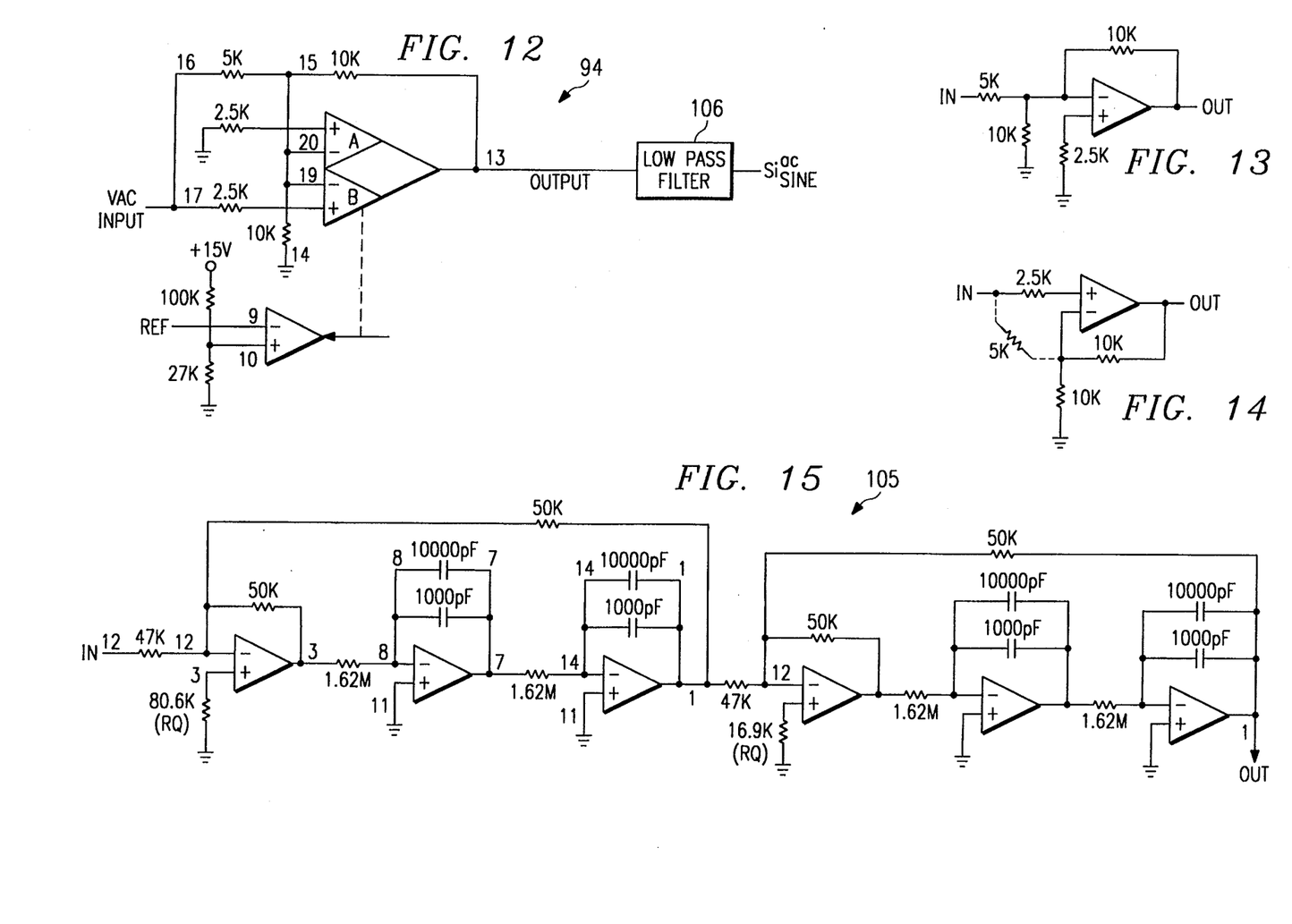
FIGS. 12-14 are schematic diagrams of a demodulation circuit of the electronics of FIG. 8.
FIG. 15 is a schematic diagram of a Butterworth low pass filter of the demodulation circuit of FIGS. 12-14.

The front-end differential amplifier 92 (FIG. 11) is the most critical electronic circuit in terms of maintaining high signal to noise. The output of each InAs detector channel (84, 86) is amplified differentially 100, eliminating common mode noise. The dc component of the detector signal (signals with frequencies less than 10 Hz) is simply buffered 102 and connected to the A/D converter 82. The ac component of the signal (signals with frequencies larger than 5 Hz) is amplified 60 dB in two separate stages (101) and is connected to the input of the demodulation circuit 94. Referring to FIG. 12, the demodulation circuit 94 takes the ac component of the detected signal (with a large 30 Hz component) and demodulates it with the reference signal ref from the quadrature signal generator 90. FIGS. 13 & 14 show an equivalent schematic of demodulation circuit 94 with A switched on and B switched on, respectively. The signal is then passed through a 4-pole Butterworth filter 105 with a 9 Hz 3 dB point (FIG. 15). The output of the filter provides the signal proportional to the amplitude of the modulated signal multiplied by the sine of the phase of the signal. An identical demodulation circuit as that of FIG. 12 demodulates the same signal using the quadrature signal quad as its reference. The output of this section of the circuit provides a signal proportional to the amplitude of the modulated signal multiplied by the cosine of the phase. The sine and cosine proportional signals are applied to the A/D converter 82.

The analog to digital (A/D) converter 82 provides the following 24 digitized signals from the four lensed wafer detectors and the four dummy lamp detectors 84 at a data rate of 10 Hz.

DC components of the lensed detectors ($S_i^{dc}$) (4 signals)

AC components of the lensed detectors ($S_i^{ac}\sin\phi, S_i^{ac}\cos\phi_{Si}$) (8 signals)

DC components of the dummy detectors ($D_i^{dc}$) (4 signals)

AC components of the dummy detectors ($D_i^{ac}\sin\phi_{Di}, D_i^{ac}\cos\phi_{Di}$) (8 signals) i=1..4 for each zone.

The preferred RTP lamp design allows for four independently controllable zones for 150-ram wafer processing. There are also four pyrometric detectors 86 that measure the temperature of the wafer at four points of the wafer corresponding to locations from center to edge. Although the detection of wafer radiation is localized within the point imaged by the lens, lamp interference detected by a particular sensor is a weighted combination of the lamp radiation from the four heating zones. Because the lamp radiation in each of the four zones can be controlled independently, the relative lamp radiation contribution from each of the four zones must be measured and calibrated. The relative contribution of lamp radiation from zone i into detector j is termed $g_{ij}$ and is a function of the reactor and lamp assembly geometry. In terms of the lamp-detector interaction, the reactor can be described in full by a matrix G, containing the geometry factors, $g_{ij}$.

We thus define, G:

$$G = \begin{bmatrix} g_{11} & g_{12} & g_{13} & g_{14} \\ g_{21} & g_{22} & g_{23} & g_{24} \\ g_{31} & g_{32} & g_{33} & g_{34} \\ g_{41} & g_{42} & g_{43} & g_{44} \end{bmatrix} \quad (1)$$

The geometry factors are obtained during a calibration run one column at a time. In order to determine the geometry factors, the effect of lamp radiation in a particular zone on each of the four detectors need to be measured. This can be done by turning on the lamps in one zone and measuring the relative signal at each of the detectors. Because this would result in unacceptable temperature non-uniformity in the wafer with resulting non-uniformities in regional reflectivity, a method based on modulation is used. In this method, the lamps in each zone is turned on to achieve uniform temperature across the wafer at about 550° C. One zone is then modulated, and the ac component in the four detectors are measured to obtain the relative susceptibility of the detectors to the given lamp zone. In obtaining the first column, $g_{i1}$, for example, the lamps are held at a power setting to maintain a 550° C. wafer temperature in all four zones. Modulation is provided in zone one only, and the resulting ac components of radiation in zone 1 to detector j is then the ratio of the amplitude of ac radiation in detector j divided by the amplitude of ac radiation from the lamps in zone 1 as monitored by the dummy lamp detector. Thus, $$g_{11} = \frac{\sqrt{S_1^{ac2}\cos^2\phi_{S1} + S_1^{ac2}\sin^2\phi_{S1}}}{\sqrt{D_1^{ac2}\cos^2\phi_{D1} + D_1^{ac2}\sin^2\phi_{D1}}} = \frac{S_1^{ac}}{D_1^{ac}} \quad (2)$$

$$g_{12} = \frac{\sqrt{S_2^{ac2}\cos^2\phi_{S2} + S_2^{ac2}\sin^2\phi_{S2}}}{\sqrt{D_1^{ac2}\cos^2\phi_{D1} + D_1^{ac2}\sin^2\phi_{D1}}} = \frac{S_2^{ac}}{D_1^{ac}} \quad (3)$$

$$g_{31} = \frac{\sqrt{S_3^{ac2}\cos^2\phi_{S3} + S_3^{ac2}\sin^2\phi_{S3}}}{\sqrt{D_1^{ac2}\cos^2\phi_{D1} + D_1^{ac2}\sin^2\phi_{D1}}} = \frac{S_3^{ac}}{D_1^{ac}} \quad (4)$$

$$g_{41} = \frac{\sqrt{S_4^{ac2}\cos^2\phi_{S4} + S_4^{ac2}\sin^2\phi_{S4}}}{\sqrt{D_1^{ac2}\cos^2\phi_{D1} + D_1^{ac2}\sin^2\phi_{D1}}} = \frac{S_4^{ac}}{D_1^{ac}} \quad (5)$$

In general, with lamp modulation in zone j only, $$g_{ij} = \frac{S_i^{ac}}{D_j^{ac}} \quad (6)$$

Figure 16:
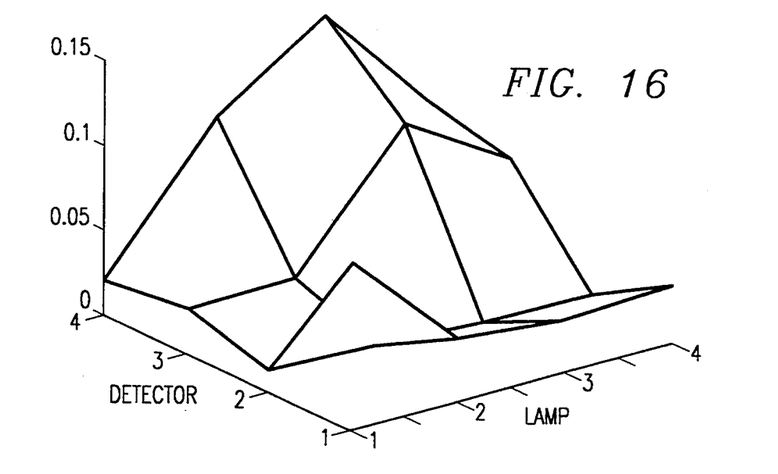
FIG. 16 is a graph of measured geometry parameters for a four zone illuminator.
Figure 17:
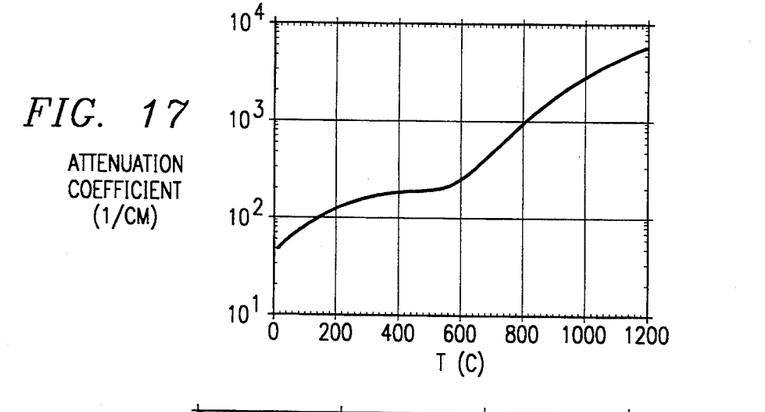
FIG. 17 is a graph of an attenuation coefficient for a p+ wafer.

An example of a mesh plot of the geometry factor is presented in FIG. 16.

The four zone lamp interference correction system can then be represented by the following system of equations $$S_i^{ac}\cos\phi_{Si} = \alpha_i \sum_{j=1}^{4} g_{ij}D_j^{ac}\cos\phi_{Dj} \quad (7)$$

$$S_i^{ac}\sin\phi_{Si} = \alpha_i \sum_{j=1}^{4} g_{ij}D_j^{ac}\sin\phi_{Dj} \quad (8)$$

$$S_i^{dc} = W_i + \alpha_i \sum_{j=1}^{4} g_{ij}D_j^{dc} \quad (9)$$

The $\alpha_i$ parameter are measurements of wafer reflectivity. The $W_i$ variables are the adjusted wafer radiance values.

In order to fully understand the significance of the various variables, an understanding of the different components of radiation seen by each detector is required. The dummy detectors are placed in a controlled and optically isolated environment and thus see radiation that can be separated into two components. One is the dc component of the lamp radiation ($D_i^{dc}$) and the other is ac component of the lamp radiation ($D_i^{ac}$). The radiation detected by the lensed detectors, however, can be separated into many components. For the detector in zone i, there are the dc component of radiation from zones j=1 to 4, as well as the wafer radiance (dc component only) from zone i. The level of the detected signal are dependent on four factors; 1.) The intensity of the lamp radiation (proportional to $D_j$), 2.) The geometry factor which is the relative efficiency of radiation channeled from zone j to detector i, ($g_{ij}$), 3.) the temperature dependent wafer reflectivity affecting detector in zone i ($\alpha_i$), and 4.) thermal radiation from the wafer.

In order for the system of 12 equations to correctly model the radiation dynamics of the AVP chamber the following assumptions need to be made.

1) Since the power delivered to dummy lamp i is identical to the power delivered to lamps in zone i, the radiation emitted from dummy lamp i is assumed to be proportional to the radiation emitted from zone i.
2) Since the thermal time constants of the silicon wafer is much larger than 1/30 sec, the 30 Hz ac component radiation detected by both the dummy and lensed detectors are assumed to be proportional to the level of radiation from lamp radiation only.
3) The geometry parameters $g_{ij}$ are assumed to be a function of the chamber and wafer geometry and are assumed to be independent of temperature (changes due to wafer reflectivity is assigned to $\alpha_i$). In addition, the geometry parameters are assumed to be equal for both dc and ac components of lamp radiation.

Equations 7 and 8 consists of an over determined system of 8 equations and 4 unknowns. Because of the consistent structure of the equations, however, the $8\times 4$ least squares problem can be broken down into four $2\times 1$ systems. The numerical solution solves for $\alpha_i$ from equations 7 and 8 using four $2\times 1$ least squares solutions.

$$\alpha_i = \frac{S_i^{ac}\cos\phi_{si}\sum_{j=1}^{4}g_{ij}D_j^{ac}\cos\phi_{Dj} + S_i^{ac}\sin\phi_{si}\sum_{j=1}^{4}g_{ij}D_j^{ac}\sin\phi_{Dj}}{\left(\sum_{j=1}^{4}g_{ij}D_j^{ac}\cos\phi_{Dj}\right)^2 + \left(\sum_{j=1}^{4}g_{ij}D_j^{ac}\sin\phi_{Dj}\right)^2} \quad (10)$$

The four $\alpha_i$ values computed above are proportional to the reflectance values at the temperature measurement points.

The $\alpha_i$ values are measures of localized wafer reflectivity scaled by the geometry parameters ($g_{ij}$). When the reflectivity of the wafer is zero, no radiation will be imaged by the lens and thus $\alpha_i$ value will be zero. The $\alpha_i$ value will equal one when the wafer reflectivity is equal to the reflectivity at which the $g_{ij}$ parameters were taken. The theoretical maximum value of $\alpha_i$ will be reached when the wafer reflectance is one. Because $\alpha_i$ maintains linearity through this range, one calibration point with a non-zero wafer reflectivity is needed to obtain the reflectance value $R_i$. This calibration point can be obtained by placing a wafer of known reflectivity at a given temperature when obtaining the geometry parameters. Given the known reflectivity $R_{cal}$ during the determination of the geometry parameters, the wafer reflectance value ($R_i$) can be determined from the $\alpha_i$ values by computing $$R_i = R_{cal}\alpha_i \quad (11)$$

In order to compute emissivity from Kirchoff Law ($\epsilon_i = 1 - R_i - T_i$) the transmittance values ($T_i$) are also needed. The transmittance values can be obtained in real-time by applying the same techniques used to obtain the reflectance values. Lensed detectors imaging points on the opposite side of the wafer will detect the modulated component of the lamp radiation. Transmittance parameters ($\tau_i$) is computed using similar numerical techniques used to solve for $\alpha_i$. This value will be normalized for the geometry factor at a known reference transmittance to obtain $T_i$ in a manner similar to the computation for $R_i$.

In order to analyze the wafer as an optical material, it is instructive to separate the interface effects from the bulk effects. Interface effects involve the reflection and transmission of optical waves at an index of refraction discontinuity. Interface effects include the interference effects of a system of thin films on the wafer.

Bulk effect is essentially the attenuation of optical waves as it propagates through the silicon bulk due to interband (fundamental) absorption, intraband absorption, lattice vibrational absorption, and free-carrier absorption. For radiation at 3.3 $\mu$m, however, only the free-carrier absorption need to be considered. Because the photon energy at 3.3 $\mu$m is much smaller than the 0.66 eV bandgap reached when the wafer is at 1200 C., there are no interband (fundamental) absorption. Lattice vibrational absorption is negligible for EM waves with wavelengths less than 6 $\mu$m. For n-type silicon, the absorption band due to interband transition between conduction sub-bands need to be considered in addition to the free-carrier absorption.

Classical theory of free-carrier absorption is used to calculate the extent of attenuation of radiation as the wave propagates through the thickness of the wafer. This values represents the maximum value of transmittance for a given wafer condition. That is, the analysis computes the transmittance value when the reflectance at the surface of the wafer is zero.

The radiation intensity out of the opposite side of the wafer can be computed as $$I = I_o e^{-2\beta'd} \quad (12)$$

where I is the attenuated intensity, $I_o$ is the intensity of radiation entering the wafer bulk, d is the thickness of the wafer, and $\beta'$ is the attenuation constant.

The ratio of the transmitted intensity to the initial intensity is the transmittance value assuming zero reflectance ($T_{max}$).

$$T_{max} = I/I_o = e^{-2\beta'd} \tag{13}$$

The attenuation constant a can be solved using classical theory as follows: where $k_d$ is the extinction coefficient given by $$\beta' = \frac{2\pi k_d}{\lambda} \tag{14}$$

$$k_d = \frac{x}{2n_d} \tag{15}$$

where $$x = \frac{1}{\omega}(g_e a + g_h b) \tag{16}$$

$$a = \frac{q^2 n \mu c^2}{m_e(\omega^2 + g_e^2)} \tag{17}$$

$$b = \frac{q^2 p \mu c^2}{m_h(\omega^2 + g_h^2)} \tag{18}$$

In the above equations $\mu$ is the permeability of silicon, n and p are the electron and hole concentrations, me and mh are the effective mass of electron and holes, and $g_e$ and $g_h$ are the damping constants of electrons and holes given by $$G_e = q/\mu_n m_e \tag{19}$$

The index of refraction of doped silicon, $n_d$ is given by $$g_h = \frac{q}{\mu_p m_k} \tag{20}$$

$$n_d = \sqrt{\frac{N_p^2 - a - b}{2} + \frac{1}{2}\sqrt{(N_p^2 - a - b)^2 + x^2}} \tag{21}$$

where $n_p$ us the index of refraction of pure silicon $$n_p = 3.45 + \frac{5.076 \times 10^{-4}}{\lambda}(T - 300) \tag{22}$$

with $\lambda$ is measured in $\mu$m.

The carrier mobilities are assumed to be independent of wavelength and are given by $$\mu_n = \mu_{n(300K)}\left(\frac{T}{300}\right)^{-2.42} \tag{23}$$

$$\mu_p = \mu_{p(300K)}\left(\frac{T}{300}\right)^{-2.20} \tag{24}$$

where $\mu_{n(300K)}$ and $\mu_{p(300K)}$ are the electron and hole mobilities at 300K given by $$\mu_{n(300K)} = 92 + \frac{1268}{1 + \left(\frac{N_a + N_d}{1.3 \times 10^{17}}\right)^{0.91}} \tag{25}$$

$$\mu_{p(300K)} = 47.7 + \frac{447.3}{1 + \left(\frac{N_a + N_d}{6.3 \times 10^{16}}\right)^{0.76}} \tag{26}$$

$N_a$ and $N_d$ are the acceptor and donor concentrations.

The electron and hole concentrations are also assumed to be independent of wavelength and are given by $$n = \frac{N_d - N_a}{2} + \sqrt{\left(\frac{N_d - N_a}{2}\right)^2 + n_i^2} \tag{27}$$

$$p = \frac{N_a - N_d}{2} + \sqrt{\left(\frac{N_a - N_d}{2}\right)^2 + n_i^2} \tag{28}$$

The attenuation constant ($\beta'$) and the radiation transmission through the bulk ($T_{max}$) at 3.3 $\mu$m are computed for a $5 \times 10^{18}$ cm$^{-3}$ p+epi wafer and for an undoped wafer. The results of the analysis are presented in FIGS. 14 to 17.

Given the real-time reflectance ($R_i$) and transmittance ($T_i$), the emissivity can be obtained from Kirchoff law.

$$\epsilon_i = 1 - R_i - T_i \tag{29}$$

For heavily doped wafers such as epitaxial wafers with p+ substrates, it can be shown that transmittance is negligible ($T_{max} < 1\%$) throughout the processing temperature range (FIG. 15). Thus, for heavily doped epi wafers, the emissivity can be computed simply as $$\epsilon_i = 1 - R_i \tag{30}$$

Undoped wafers have negligible transmittance values ($T_{max} < 1\%$) above 600° C. Thus for temperatures above 600° C., equation 19 can also be used.

For wafer conditions that result in significant transmittance, a set of sensors on the opposite side of the wafer is needed to continuously monitor the transmittance value ($T_i$). Equation 29 can then be used to compute emissivity.

Figure 18:
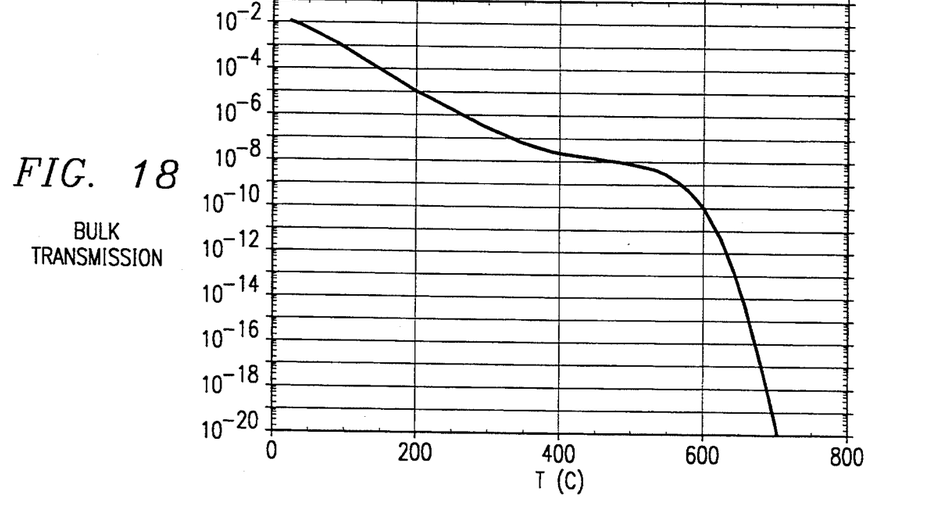
FIG. 18 is a graph showing bulk transmission for a p+ wafer.
Figure 19:
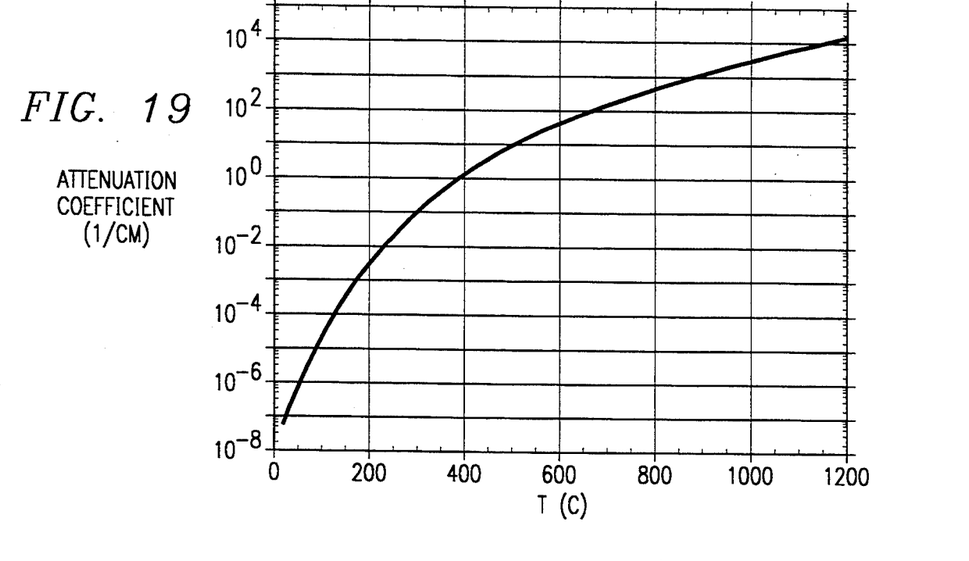
FIG. 19 is a graph showing the attenuation coefficient for an undoped wafer.
Figure 20:
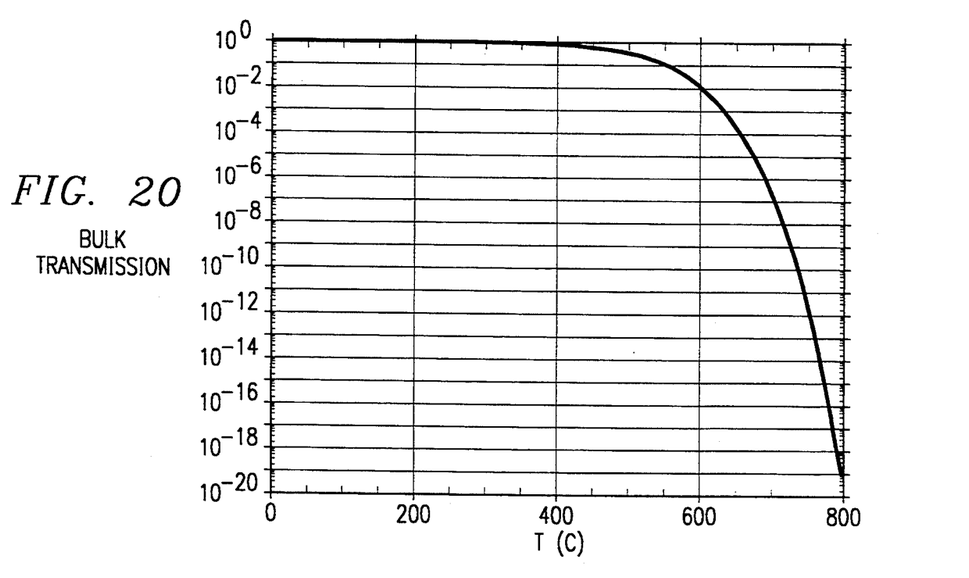
FIG. 20 is a graph showing bulk transmission for an undoped wafer.
Figure 21:
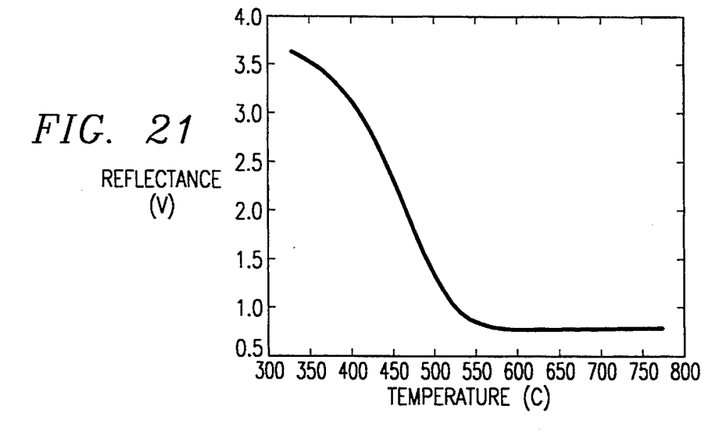
FIG. 21 is a graph of reflectance as a function of temperature.
Figure 22:
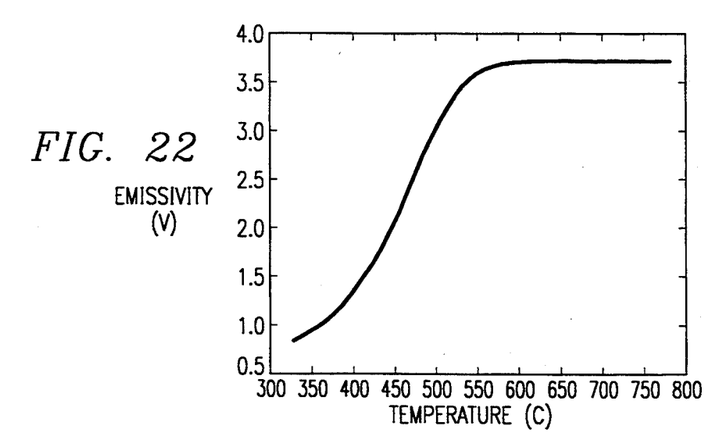
FIG. 22 is a graph of emissivity as a function of temperature.
Figure 23:
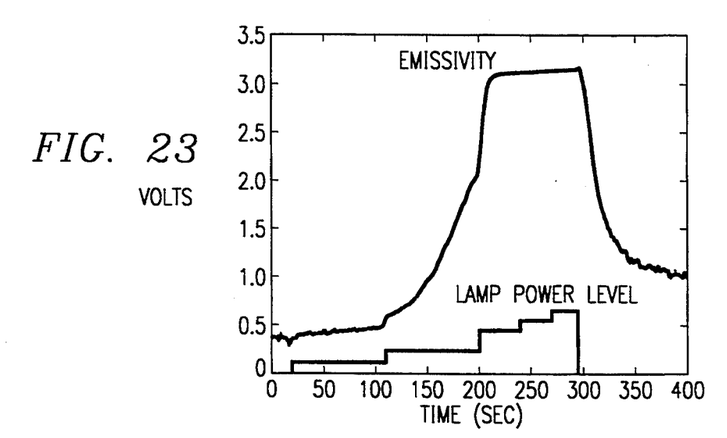
FIG. 23 is a graph of a real-time measurement of emissivity.

Uncalibrated real-time reflectance and emissivity values have been obtained from temperature ramp-up and ramp-down of a p+ epi wafer. FIG. 18 illustrates uncalibrated reflectance value measured against temperature while FIG. 19 illustrates the uncalibrated emissivity value. FIG. 20 illustrates the dynamic changes in wafer emissivity as lamp power is varied.

The relationship between temperature and spectral radiant existence is expressed as $$W = \epsilon M \tag{31}$$

where W is the spectral radiant existence of the wafer and M is the spectral existence of a black body given by $$M = \frac{2\pi hc^2}{\lambda^5(E^{hc/\lambda kT} - 1)} \quad (32)$$

where $\lambda$ is the emitted wavelength, T is the temperature, h is Planck's constant, c is the speed of light and k is Boltzman's constant.

At a given wavelength, the pyrometer measurement is directly scaled by emissivity ($\epsilon$). When building the lookup table relating wafer radiance to temperature, the wafer radiance should first be corrected for lamp interference and then be normalized by the emissivity to obtain the effective black body radiance. A system and method for multizone lamp interference correction is described in co-pending U.S. patent application Ser. No. 08/168,433, filed Dec. 16, 1993 (TI-17944), and assigned to Texas Instruments Incorporated and is hereby incorporated by reference. For each zone $i=1..4$, $$M_i = W_i/\epsilon_i \quad (33)$$

where $M_i$ is the effective black body radiance of the wafer, $W_i$ is the lamp interference corrected wafer radiance, and $\epsilon_i$ is the emissivity. The effective black body radiance of the wafer $M_i$, therefore is a value that is corrected for both lamp interference and emissivity variation.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for multi-zone real-time emissivity correction for a multi-zone thermal processing system having a plurality of lamps arranged in a plurality of zones, comprising the steps of:
   a. determining a plurality of geometry factors for each zone of said system;
   b. modulating a plurality of power sources synchronized to a line frequency and connected to said plurality of zones;
   c. monitoring a wafer using a first plurality of sensors, wherein each of said first plurality of sensors generates a first signal,
   d. monitoring the modulation depth of said plurality of zones by monitoring a plurality of dummy lamps using a second plurality of sensors, one sensor of said second plurality of sensors for each zone, wherein each of said second plurality of sensors generates a second signal for each respective zone;
   e. determining an emissivity factor for each of said zones based on said plurality of first signals and said second signal for each zone; and
   f. correcting for effects of emissivity including determining an effective black body radiance for each zone based on a wafer radiance factor for each zone and said emissivity factors, said wafer radiance factor for each zone being based in part on said plurality of geometry factors for each zone.

2. The method of claim 1, wherein each of said wafer radiance factors is further based in part on one of said first signals.

3. The method of claim 1, wherein the step of determining said emissivity factor for each zone comprises the steps of:
   a. determining a calibration reflectance for said wafer during said step of determining said geometry factors;
   b. determining a wafer reflectivity factor for each of said zones from said plurality of first signals and said second signal for each zone;
   c. determining a reflectance value for each zone based on said wafer reflectivity factors and said calibration reflectance; and
   d. calculating said emissivity factors from said reflectance values.

4. The method of claim 3 wherein said wafer radiance factor for each zone is determined by removing a lamp interference factor from at least a portion of one of the first signals, wherein said lamp interference factor is based on at least one of said geometry factors, at least one of said wafer reflectivity factors, and at least one of said second signals.

5. The method of claim 1, wherein said step of determining said geometry factors comprises the steps of:
   a. supplying power to said plurality of lamps;
   b. modulating the power to one of said zones;
   c. determining the amplitude of the ac component of each of said first signals for said one;
   d. determining the amplitude of the ac component of said second signal for said one zone;
   e. for said one zone, dividing each of said ac components of said first signals by said ac component for said second signal for said one zone to obtain said geometry factors for said one zone; and
   f. repeating steps b through e for each of said zones.

6. The method of claim 1, wherein said first and second pluralities of sensors comprise pyrometers.

7. The method of claim 1, further comprising the step of determining said wafer radiance factor by:
   a. separating each of said first and second signals into a dc component, an ac sine component, and an ac cosine component, wherein said ac sine and cosine components can be converted to ac amplitude and phase components;
   b. calculating the wafer reflectivity factor according to the formula:

$$\alpha_i = \frac{S_i^{ac}\cos\phi_{si} \sum_{j=1}^{4} g_{ij}D_j^{ac}\cos\phi_{Dj} + S_i^{ac}\sin\phi_{si} \sum_{j=1}^{4} g_{ij}D_j^{ac}\sin\phi_{Dj}}{\left(\sum_{j=1}^{4} g_{ij}D_j^{ac}\cos\phi_{Dj}\right)^2 + \left(\sum_{j=1}^{4} g_{ij}D_j^{ac}\sin\phi_{Dj}\right)^2}$$

c. calculating said wafer radiance factor for each zone according to the formula:

$$W_i = S_i^{dc} - \alpha_i \sum_{j=1}^{n} g_{ij}D_j^{dc}$$

wherein:
   $W_i$ is the corrected wafer radiance for the ith zone;
   $S_i^{dc}$ is the dc component of the wafer based signal for the ith zone;
   $\alpha_i$ is the wafer reflectivity for the ith zone;
   n is the number of zones;
   $g_{ij}$ is the relative efficiency of radiation for the jth zone from the ith detector zone (geometry factor); and
   $D_j^{dc}$ is the dc component of the lamp radiance signal for the jth zone.
   $S_i^{ac}$ is the ac component of the wafer based signal for the ith zone.

8. The method of claim 1, wherein said plurality of zones comprises four zones.

* * * * *